Patented June 8, 1948

2,443,168

UNITED STATES PATENT OFFICE 2,443,168

PROCESS OF PURIFYING LITHIUM HYPOCHLORITE

Homer Louis Robson, Lewiston, N. Y., assignor to Mathieson Chemical Corporation, a corporation of Virginia No Drawing. Application August 17, 1945, Serial No. 611,236

5 Claims. (Cl. 23—86)

1

This invention relates to a process for the purification of lithium hypochlorite monohydrate, $LiOCl.H_2O$.

Impurities removed from lithium hypochlorite monohydrate according to the process include water, other than the water molecularly bound in the lithium hypochlorite monohydrate, lithium chloride and lithium chlorate. One or all of these impurities may be present depending upon the method by which the monohydrate has been prepared. The process involves the use of liquid tertiary butyl alcohol as solvent in the purification treatment which may take the form of a simple washing of the impure lithium hypochlorite monohydrate with the alcohol.

I first conceived of my process as one for the separation of the above impurities from anhydrous lithium hypochlorite, i. e., a lithium hypochlorite-containing product in which the water content of the lithium hypochlorite is not substantially in excess of about 2–3% on the weight of the lithium hypochlorite. However, when I applied the process to the purification of anhydrous lithium hypochlorite, an alcoholate was formed which was not decomposed with production of lithium hypochlorite by ordinary vacuum drying. The alcohol, as nearly as I could determine, represented about 30% of the weight of the lithium hypochlorite-alcohol complex. Although the alcohol can be driven off to obtain anhydrous lithium hypochlorite by employing vacuums and temperatures successful in converting the monohydrate to anhydrous lithium hypochlorite, such an operation is not commercially practicable due to the deleterious effect of high concentrations of tertiary butyl alcohol on the vacuum pumps, and to the difficulty encountered in recovering the alcohol from the effluent gas stream. While the alcoholate is fairly stable in comparison with most organic preparations containing hypochlorite, its handling and storage constitutes a definite hazard.

I have now unexpectedly discovered that when lithium hypochlorite monohydrate, contaminated with lithium chloride, lithium chlorate, or water is contacted with tertiary butyl alcohol under conditions resulting in removal of these impurities, no alcoholate is formed. In other words, I have found that the alcohol treatment, although inoperable, or at least commercially impracticable, in the case of anhydrous lithium hypochlorite, is well adapted for the removal of the specified contaminants from the monohydrate.

In the copending application of Homer L. Robson and Edward C. Soule, Serial No. 475,175, filed February 8, 1943, now abandoned, there is de-

2 scribed a method of preparing anhydrous lithium hypochlorite which comprises drying the monohydrate at a temperature within the range of 20–60° C. at a pressure less than $\frac{1}{10}$ the vapor pressure of water at the particular temperature employed. Occasionally in the execution of such process, due usually, to failure on the part of the operator to properly control the temperature or pressure or both, partial decomposition of the hypochlorite with production of chloride and chlorate occurs. A particularly important application of the process of the present invention is in the recovery of hypochlorite values from these spoiled batches.

Lithium hypochlorite monohydrate prepared in the conventional manner by chlorinating an aqueous solution of lithium hydroxide is amenable to purification according to the present process. The process is also applicable, for example, to the purification of lithium hypochlorite monohydrate produced by reaction of lithium hydroxide with alkyl hypochlorites or chlorine monoxide or by the processes representing inventions of Edward C. Soule described in copending applications, Serial Nos. 479,778 and 479,779, filed March 19, 1943, and both now abandoned. In the process of the first of said applications, lithium chloride is reacted with sodium or potassium hypochlorite, while in the process of the second, lithium carbonate or sulfate is reacted with an alkaline earth metal hypochlorite.

In the commercial practice of the foregoing processes for preparing lithium hypochlorite monohydrate, a filter cake is obtained comprising the monohydrate and adhering mother liquor. According to my process, the cake is largely freed of mother liquor by repulping it with tertiary butyl alcohol at a temperature above the solidification temperature of the alcohol and filtering the resulting mass. In the filtration, most of the mother liquor passes through the filter leaving a cake wet principally with alcohol. This cake is washed with further quantities of dry tertiary butyl alcohol to remove any remaining amounts of mother liquor present as an emulsion of mother liquor and alcohol and to remove alcohol wet with water. Finally the cake is accorded a light drying under vacuum to separate alcohol. Since only a minor amount of alcohol is present, there is little adverse effect on the vacuum pump and economic considerations do not require scrubbing of the gas stream to recover it. The drying to remove alcohol may be followed by a further drying conducted under a vacuum to remove the small amount of unbound water (2-5%) not separated by the alcohol treatment.

In lieu of pure tertiary butyl alcohol, mixtures thereof with solvents of lower viscosity may be used in the practice of the invention as hereinafter described.

An advantage of the process of the invention resides in the fact that it leaves the monohydrate in a substantially free flowing form in which form it is rapidly and easily converted to anhydrous lithium hypochlorite by the process of application Serial No. 475,175 previously mentioned. In the absence of the alcohol treatment, the amount of unbound water may amount to as much as 30%, and extensive evaporation treatment to remove this water, often accompanied by decomposition of the monohydrate, is therefore necessary. Also, when the drying is by heat alone without prior alcohol treatment, a preliminary grinding operation is usually essential.

When the slurry, supra, contains lithium chloride most, or at least a major portion of the lithium chloride, will be removed in the mother liquor. Ordinarily, when present in the slurry, the lithium chloride will account for about 6-12% of the weight of the solid phase of the cake before alcohol treatment. After the alcohol treatment, the chloride usually accounts for not more than about 0.1% to 4% of the weight of the solid phase of the cake, the exact percentage depending upon the chloride content before alcohol treatment, the care exercised in the re-pulping operation and the manner in which the filtration is carried out. The enumerated factors are also important in connection with removal of chlorate. Removal of chlorate is somewhat more difficult than removal of chloride because the chlorate is held in an aqueous phase relatively slowly attacked by the alcohol. However, in many instances, I have succeeded in producing a final dry hydrate, by which I mean a lithium hypochlorite monohydrate product essentially free of water not molecularly bound, having a chlorate content of less than one-fourth that of the slurry from which it was derived.

Tertiary butyl alcohol has a high viscosity and this property somewhat retards its removal from the monohydrate preparation by filtering. I have found that the amount of liquid in the cake prior to evaporation treatment to remove alcohol may be reduced by washing the cake, first with a blend of dry tertiary butyl alcohol and another non-reactive solvent of lower viscosity; then with the lower viscosity solvent alone. Two solvents which are particularly suitable are carbon tetrachloride and chloroform. Whereas tertiary butyl alcohol has a viscosity of about three times that of pure water, carbon tetrachloride has a viscosity of slightly less than water and chloroform a viscosity of a little more than half that of water. By washing the butyl alcohol wet cake with a mixture of alcohol and chloroform, for example, or, more preferably, first with the mixture and then with chloroform alone, much less solvent will be left adhering to the lithium hypochlorite monohydrate than where an auxiliary solvent is not used. The cake resulting from this treatment is nearly free flowing, and becomes altogether free flowing upon removal, by evaporation, of the solvent remaining in the cake following the final wash.

The use of an auxiliary solvent, of course, introduces an additional expense. However, I have found, that the bulk of the auxiliary solvent may be recovered by diluting the filtrate with water, so that the low viscosity material settles out, while the alcohol passes to the water layer. The auxiliary solvent may be separated from the water layer, blended with dry tertiary butyl alcohol, and used again.

The use of an auxiliary solvent in the manner described is especially advantageous where it is desired to charge the cake directly to a rotary vacuum drier. If the alcohol-wet cake is not washed with a low viscosity material, before being charged to such a drier, caking will ordinarily occur and this is highly undesirable from the standpoint of the further processing of the monohydrate.

It is to be emphasized that carbon tetrachloride and chloroform are not equivalent to tertiary butyl alcohol in the present process. The passage of a large volume of either of these solvents alone through a filter cake obtained by the filtration of an aqueous slurry of lithium hypochlorite monohydrate will reduce the mother liquor content only about 50% as compared to almost 100% removal in the instance of tertiary butyl alcohol. Re-pulping and re-washing will effect some further reduction, but undesirably large amounts of the wash liquid are required, most of which short circuits through channels. Moreover, the final cake on drying shows a pronounced tendency to form hard lumps. Carbon tetrachloride and chloroform, as used alone, do not readily wet crystals previously wet with water, and do not easily form an emulsion with water like tertiary butyl alcohol. The properties of tertiary butyl alcohol which render it so well suited for the purification of lithium monohydrate are possessed in only part by its mixtures with carbon tetrachloride and with chloroform.

There are a number of compounds in addition to carbon tetrachloride and chloroform which may be safely mixed with lithium hypochlorite monohydrate and which may be blended with tertiary butyl alcohol to form blends functionally equivalent in the process of the invention to blends prepared with carbon tetrachloride or chloroform. In general, any organic material of lower viscosity than tertiary butyl alcohol and soluble therein which is substantially insoluble in water and non-reactive with respect to lithium hypochlorite monohydrate may be employed in lieu of carbon tetrachloride or chloroform in the practice of the invention. Ortho dichlorobenzene, to cite one example, was employed in a number of experiments with good effect.

Although the initial filter cake may be repulped with a blend comprising a solvent of lower viscosity than tertiary butyl alcohol, I have found it preferable to re-pulp the initial cake with the pure alcohol. This first re-pulping may be advantageously carried out using a volume of alcohol substantially equivalent to the volume of the cake. In operating in this fashion, advantage is taken of the high viscosity of the alcohol which aids in mechanically separating adhering masses of crystals which occlude aqueous mother liquor. The re-pulping operation must of course be effected at a temperature above the solidification temperature of the teritary butyl alcohol. This compound exists as a solid at temperatures below 23-25° C. The addition of minor amounts of water lowers this solidification temperature.

Lithium hypochlorite monohydrate crystallizes in flat plates which may vary in diameter from 1 mm. down to .01 mm. The small crystals are slow filtering, and considerable mixing or mulling with the alcohol is required to remove the aqueous phase held between groups of small crystals. With the large crystals, employing only vacuum for filtration, it is possible to filter, re-pulp, filter, and wash, all in about one half hour, but with small crystals varying from .01 to .02 mm. up to about nine hours may be required. It is obviously uneconomical to work with small crystals if larger ones can be obtained readily, or if the small crystals can be simply converted into larger ones. Crystallization of lithium hypochlorite monohydrate from a solution being concentrated under vacuum, the solution having been properly seeded and agitated, ordinarily yields large crystals. Small crystals generally are obtained in the production of lithium hypochlorite monohydrate by the direct chlorination of lithium hydroxide solutions. The size of these crystals may be slightly increased by alternately subjecting the slurry to heating to a temperature of about 40° C. and cooling to a temperature of about 0° C. I generally employ a heating period of less than 15 minutes and a cooling period of several hours with slow stirring and repeat the cycle about six times. In this way filtration time may be reduced as much as one-third.

My invention is further illustrated by the following examples in which parts are by weight:

EXAMPLE I 240 grams of a lithium hypochlorite preparation which had partly decomposed in a drying operation which had as its purpose the production of anhydrous lithium hypochlorite was treated according to the invention to lower the chlorate and chloride content. This material showed the analysis under "crude" in the table below.

The re-pulping with tertiary butyl alcohol was carried out with one liter of alcohol of 0.814 specific gravity containing 5% water. After five minutes stirring the mixture was filtered, the filtration yielding 430 grams (520 cc.) of filtrate having a specific gravity of 0.828. The cake was then washed with two 150 cc. portions and one 200 cc. portion of dry tertiary butyl alcohol, the washing operations yielding 480 grams (580 cc.) of wash liquor having a specific gravity of .828 and 130 grams (158 cc.) of a more dilute wash liquor having a specific gravity of 0.824. The strong wash liquor was combined with the filtrate and the analysis of the mixture is given under "filtrate" below. Analysis of the weak wash liquor is shown under "Wash Liquor". The washed filter cake was given a light vacuum treatment to flash off alcohol, giving 225 grams of a fairly free flowing, slightly damp material having the composition given below as "Damp." This material was rapidly dried to a composition having the analysis shown under "Hydrate" in the table and then the drying was continued to give the "Final dry" composition. The final dry composition was much more stable than the starting "crude" material due to the lower chlorate, water and chloride content.

Table I

| | Crude | Damp | Hydrate | Final Dry | Filtrate | Wash Liquor |
|---|---|---|---|---|---|---|
| | Per cent | Per cent | Per cent | Per cent | Grams per liter | Grams per liter |
| LiOCl | 69.36 | 66.86 | 75.09 | 89.44 | 7.8 | 13.1 |
| LiClO₃ | 7.57 | 1.20 | 1.61 | 3.49 | 12.0 | 7.8 |
| LiCl | 11.96 | 2.61 | 3.12 | 4.35 | 19.1 | 6.1 |
| LiOH | .09 | 1.09 | .11 | 2.27 | | |
| Water, etc | 11.02 | 28.24 | 18.3 | .44 | | |
| Avail. Cl² | 84.82 | 81.75 | 91.82 | 109.38 | | |

EXAMPLE II

A slurry of lithium hydroxide was chlorinated to yield a solution of lithium hypochlorite and chloride. This was filtered to remove impurities and evaporated under vacuum until the liquid phase contained 17.2% LiOCl and 24.0% LiCl and .44% LiClO₃. The slurry was then filtered and pressed lightly, obtaining a cake of composition S-1 in Table II. 17.8 parts of this cake were re-pulped with 14 parts of dry tertiary butyl alcohol, and the resulting slurry filtered. The filtrate separated into two layers. The composition of the lower or aqueous layer was L-1 (see table) and that of the upper layer L-2. The cake was then washed with an additional 22 parts of tertiary butyl alcohol, added in small amounts. A total of 34 parts of filtrate and wash alcohol layer was obtained, the chloride content of the cake progressively decreasing with each wash. The final cake after light pressing had the composition S-2. This cake was subjected to vacuum drying to remove alcohol and to slightly dehydrate the monohydrate, the drying yielding a material of composition S-3. From the analyses of the cake S-1 and of the original solution of the slurry, it will be seen that the cake contained 37% or 6.6 parts of mother liquor, and that the aqueous layer obtained on filtration was substantially this amount, showing that the washing procedure removed substantially all the mother liquor. The solid S-3 was granular and free flowing, not lumpy, as it would have been if the crystals of the monohydrate had been wet with an aqueous phase when placed in the drier.

Table II

| | Solids | | | Filtrates | |
|---|---|---|---|---|---|
| | S-1 | S-2 | S-3 | L-1 | L-2 |
| | Per cent | Per cent | Per cent | Per cent | Per cent |
| LiOCl | 54.0 | 61.75 | 78.8 | 19.0 | 1.52 |
| LiClO₃ | .21 | .13 | .35 | .23 | |
| LiCl | 8.86 | .11 | 2.92 | 19.54 | 2.47 |
| Water, etc | 37.0 | 38.0 | 18.0 | 61.2 | |
| Weight | 17.8 | 12.3 | 9.1 | 6.6 | 6± |
| Specific Gravity | | | | 1.315 | .84 |

EXAMPLE III

A slurry of lithium hydroxide was chlorinated to obtain a slurry of lithium hypochlorite monohydrate. The crystals were poor, and were subjected to alternate heating and cooling to improve them. They were filtered by vacuum, obtaining a filter cake of composition S-4. Because of its high chloride content and poor crystals this was considered a poor cake for washing tests. 69 parts of this cake were re-pulped with 32 parts of dry tertiary butyl alcohol, and the resulting slurry filtered, the filtration yielding 51.5 parts of cake, 25 parts of an aqueous phase of 1.315 specific gravity and composition L–3 and 12.6 parts of an alcoholic phase of composition L–4. The cake was again re-pulped with 32 parts butyl alcohol and filtered, 45.2 parts cake and 36 parts alcoholic phase of composition L–5 being obtained. There was also obtained 1.72 parts of aqueous phase assumed to correspond to L–3 in composition. The cake was washed twice with 20 part portions of 50% chloroform–60% butyl alcohol, to obtain 43.2 parts of a cake of composition S–5. A small portion of this cake was dried to give a monohydrate of composition S–6. As the chloride content was still high, the balance of the cake, about 40 parts, was re-pulped in 25 parts dry tertiary butyl alcohol and stirred thoroughly to break down aggregates, then filtered and washed twice with 20 parts of the half chloroform-half butyl alcohol mixture and once with 15 parts of chloroform. The resulting cake although damp was easily broken up. After flashing off of the chloroform and alcohol, and giving the material a slight drying, 27.0 parts of monohydrate of composition S–7 were obtained.

some unchanged lithium hydroxide monohydrate, wet with both water and alcohol. The hypochlorite crystals were small. Filtration of the slurry yielded 754 parts of aqueous phase of 1.31 specific gravity and 1110 parts alcoholic phase having a specific gravity of 0.85. The alcoholic phase contained 10.7 g. p. l. lithium hypochlorite, and less than .5 g. p. l. lithium chloride. The aqueous phase contained 38.7% LiOCl.

The filter cake obtained above was re-pulped with 160 parts of dry tertiary butyl alcohol, and the resulting mass filtered and washed with an additional 80 parts dry alcohol. This procedure yielded 52 parts additional aqueous layer, which was assumed to be of the same composition as that obtained in the first filtration. The cake was then washed with 225 parts of chloroform. 660 parts of chloroform wet cake were obtained, 450 parts of which were treated to flash off chloroform and alcohol. 308 parts of a lumpy product having an alcohol odor resulted upon the evaporation treatment. To remove the odor of alcohol, the material was ground to 14 mesh fineness and treated under vacuum. Subsequent to Table III

|  | S–4 | S–5 | S–6 | S–7 | L–3 | L–4 | L–5 |
|---|---|---|---|---|---|---|---|
|  | Per cent | Per cent | Per cent | Per cent | Per cent | Per cent | Per cent |
| LiOCl | 45.0 | 51.83 | 71.08 | 73.92 | 23.3 | 2.14 | 2.08 |
| LiClO$_3$ | .23 |  |  | .45 | .11 | .02 | trace |
| LiCl | 12.9 | 2.96 | 4.92 | 4.4 | 17.2 | 3.18 | 1.72 |
| Water, etc | 58.1 |  |  |  |  |  |  |
| Weight | 69.1 | 43.2 | 2± | 27 | 25.0 | 12.6 | 36 |

Example IV

A solution of lithium hypochlorite was prepared by agitating 600 parts of LiOH.H$_2$O with 1110 parts water and 1750 parts of 95% tertiary butyl hypochlorite. During the agitation the mixture was maintained at temperatures between 20° C. and 30° C. The aqueous solution was concentrated under vacuum at 40° C. until it contained 47.2% lithium hypochlorite. With further concentration under vacuum a slurry of large crystals of lithium hypochlorite monohydrate was obtained. This slurry was cooled to 15° C. and filtered, the filtration yielding 825 parts of filtrate containing 40.68% LiOCl and 1.02% LiCl, and 500 parts of cake containing 63.96% LiOCl. The cake was re-pulped with 224 parts of dry tertiary butyl alcohol and filtered. The cake resulting from this filtration was washed with 120 parts of a 65% chloroform-35% tertiary butyl alcohol mixture, and then with 150 parts of chloroform. The washed cake (422 parts) contained 54.68% LiOCl. 250 parts of wash liquor having a specific gravity of 0.99 and containing 5.3 grams per liter of LiOCl were obtained. The alcohol and chloroform were flashed from the cake and the cake given a light drying which gave a monohydrate composition of the following analysis:

| | Percent |
|---|---|
| LiOCl | 75.14 |
| LiClO$_3$ | .53 |
| LiCl | .31 |
| LiOH | .73 |

The monohydrate composition was free flowing, and hence easily handled during subsequent further drying.

Example V 600 parts of LiOH.H$_2$O were stirred with 500 parts water and 1800 parts of 95% tertiary butyl hypochlorite for several hours, the temperature during the mixing being kept under 30° C. This produced a slurry of lithium hypochlorite and the vacuum treatment the material showed 68.25% LiOCl, .39% LiCl and 4.65% LiOH on analysis. Upon further drying a product was obtained analysing:

| | Per cent |
|---|---|
| LiOCl | 67.56 |
| LiClO$_3$ | .09 |
| LiCl | 1.21 |
| LiOH | 8.98 |
| Water and misc. | 22.16 |

The experiment of Example I illustrates the process of the invention as applied to the treatment of partly decomposed batches of lithium hypochlorites. It will be noticed that in this experiment the alcohol with which the batch was initially pulped contained 5% water. This was to prevent the production of a lithium hypochlorite alcoholate which otherwise would have resulted from reaction between the alcohol and hypochlorite in the spoiled batch having less water molecularly associated therewith than is present in lithium hypochlorite monohydrate. By including the water with the alcohol such hypochlorite became converted to the monohydrate state, in which state lithium hypochlorite is essentially non-reactive with tertiary butyl alcohol. The 5% water was also sufficient to convert that portion of the lithium chloride in the preparation having less water associated therewith than is present in lithium chloride monohydrate to lithium chloride monohydrate. Always before treating these spoiled batches, the water content thereof should first be ascertained and the indicated amount of additional water supplied through the medium of the alcohol.

I claim:
1. A process which comprises admixing a crude, wet lithium hypochlorite preparation with tertiary butyl alcohol at a temperature above the solidification temperature of the alcohol, filtering the mixture, washing the filter cake with dry tertiary butyl alcohol in the liquid state and heating the washed cake to drive off residual alcohol and to obtain lithium hypochlorite monohydrate of improved purity.

2. The method of claim 1 in which the viscosity of the tertiary butyl alcohol is reduced by mixing therewith a substantial amount of an organic material of lower viscosity, said material being soluble in the alcohol, substantially insoluble in water and non-reactive with respect to lithium hypochlorite monohydrate.

3. The method of claim 1 in which the viscosity of the tertiary butyl alcohol used in the washing step is reduced by mixing therewith an organic material of lower viscosity, said material being soluble in the alcohol, substantially insoluble in water and non-reactive with respect to lithium hypochlorite monohydrate.

4. The method of claim 1 in which there is interposed between the washing step and the step of heating the washed cake, a second washing step in which the washing liquid comprises in addition to tertiary butyl alcohol a chlorinated solvent soluble therein having a lower viscosity than tertiary butyl alcohol, said solvent being further characterized in that it is substantially insoluble in water and non-reactive with respect to lithium hypochlorite monohydrate.

5. A process which comprises admixing a crude, wet lithium hypochlorite preparation with tertiary butyl alcohol, filtering the mixture, washing the resulting filter cake, first with dry tertiary butyl alcohol, then with a mixture of tertiary butyl alcohol and a solvent of the group consisting of carbon tetrachloride and chloroform, and finally with a solvent selected from said group in the absence of any tertiary butyl alcohol, and heating the washed cake under conditions resulting in the removal of residual solvent to obtain lithium hypochlorite monohydrate of improved purity.

HOMER LOUIS ROBSON.

REFERENCES CITED

The following references are of record in the file of this patent:

UNITED STATES PATENTS

| Number | Name | Date |
|---|---|---|
| 1,632,484 | MacMullin | June 14, 1927 |
| 1,944,301 | Remele | Jan. 23, 1934 |

OTHER REFERENCES

Mellor, "Comprehensive Treatise on Inorganic and Theoretical Chemistry," vol. 11, 1922, page 269, Longmans, Green & Co. London, New York, Toronto.